(12) United States Patent
Porcella

(10) Patent No.: US 11,274,004 B2
(45) Date of Patent: Mar. 15, 2022

(54) FEED PULL ROLL SYSTEM WITH DETACHABLE ELASTOMERIC FEED-ROLL COVERS AND PROCESS FOR COVER REPLACEMENT

(71) Applicant: Sun Automation, INC., Glen Arm, MD (US)

(72) Inventor: Joseph A. Porcella, Bel Air, MD (US)

( * ) Notice: Subject to any disclaimer, the term of this patent is extended or adjusted under 35 U.S.C. 154(b) by 511 days.

(21) Appl. No.: 16/096,218

(22) PCT Filed: Apr. 26, 2017

(86) PCT No.: PCT/US2017/029657
§ 371 (c)(1),
(2) Date: Apr. 2, 2019

(87) PCT Pub. No.: WO2017/189737
PCT Pub. Date: Nov. 2, 2017

(65) Prior Publication Data
US 2019/0218039 A1    Jul. 18, 2019

Related U.S. Application Data

(60) Provisional application No. 62/327,840, filed on Apr. 26, 2016.

(51) Int. Cl.
*B65H 5/06*      (2006.01)
*B65H 3/06*      (2006.01)

(52) U.S. Cl.
CPC ............. *B65H 5/06* (2013.01); *B65H 3/0638* (2013.01); *B65H 2402/5121* (2013.01); *B65H 2404/114* (2013.01); *B65H 2404/181* (2013.01); *B65H 2404/185* (2013.01);

(Continued)

(58) Field of Classification Search
CPC ...... B65H 2404/114; B65H 2404/1321; B65H 2404/551; B65H 2404/5511; B65H 2601/324; B65H 3/0638; B65H 2404/181; B65H 2404/185; B65H 2402/5121
See application file for complete search history.

(56) References Cited

U.S. PATENT DOCUMENTS

| | | | | |
|---|---|---|---|---|
| 4,378,737 A | * | 4/1983 | Kirkpatrick | B26D 7/20 101/415.1 |
| 2005/0119097 A1 | * | 6/2005 | Nishimori | B65H 27/00 492/56 |
| 2012/0248691 A1 | * | 10/2012 | Hsueh | B65H 3/0638 271/264 |

* cited by examiner

*Primary Examiner* — Jeremy R Severson
(74) *Attorney, Agent, or Firm* — McKinney & Associates, LLC; J. Andrew McKinney, Jr.

(57) ABSTRACT

An improved elastomer covered feed roll assembly (32R) for use in a feed/pull roll set combination (36) in a sheet finishing machine (12) comprises a roll core (50) having a cylindrical surface (60) with multiple longitudinally spaced and circumferentially offset elongated keyways (80, 82, 84, 86) each configured as a locking slot. Multiple replaceable flexible feed cover sections (52, 54, 56) each incorporating a flexible backing (120) and an elastomeric layer or coating (122) are removably mounted on the roll core by locking components (74, 76) on opposite ends (70, 72) of each of said replaceable flexible feed cover sections, the locking components of each replaceable flexible feed cover section engaging a locking slot (80, 82, 84, 86) corresponding to the feed cover section. The keyways draw together the opposite ends (70, 72) of corresponding cover sections to form corresponding end joints (96, 98, 100).

19 Claims, 11 Drawing Sheets

(52) U.S. Cl.
CPC .................... *B65H 2404/5511* (2013.01); *B65H 2601/324* (2013.01); *B65H 2701/1764* (2013.01)

FEED PULL ROLL SYSTEM WITH DETACHABLE ELASTOMERIC FEED-ROLL COVERS AND PROCESS FOR COVER REPLACEMENT

This is a Continuation application which claims priority under 35 U.S.C. 120 and 35 U.S.C. 111(a) as the U.S. National Phase under 35 USC 371 of PCT/US17/29657, filed Apr. 26, 2017; published in English, as WO 2017/189737 on Nov. 2, 2017 and also claims priority to related and commonly owned U.S. provisional patent application No. 62/327,840, filed Apr. 26, 2016 and entitled "Feed/Pull Roll System with Detachable Elastomeric Feed-Covers, and Process for Cover Replacement", the entire disclosure of both applications are hereby incorporated herein by reference.

BACKGROUND OF THE INVENTION

Field of the Invention

The present invention relates to feeder machines for corrugated sheets, and to pull roll systems having elastomeric feed covers for such machines. More particularly, the invention relates to a feeder machine system having replaceable feed covers and to a method for changing or renewing feeder machine feed covers.

Discussion of the Prior Art

A known process for converting corrugated sheets from a blank sheet into a useable form (e.g., a shipping container, produce tray, shelf ready packaging, or other product) starts with a feed end section of a converting or finishing machine where blank sheets are fed from a hopper through the feed end section into following machine sections. The feeding process typically uses a lead edge feeder and a set of rollers forming a nip that receives the sheets, pulls them into the machine and feeds them to the next stage of the machine. To ensure proper operation, the surface of one of the rolls of the set may be covered with an elastomeric layer, while the other roll has a knurled surface. This set of rollers may be referred to herein as "feed/pull rolls" for convenience. The feed/pull rolls, and in particular the elastomeric (e.g., nitrile rubber or urethane) covers for such rolls wear with use and feeding performance suffers. When elastomer cover wear becomes excessive, there is insufficient grip to reliably pull a sheet from beneath a stack of sheets in a hopper.

The function of a feed/pull roll set in a finishing machine is to grip a corrugated sheet sufficiently to pull it out from the bottom of a stack of sheets in a supply hopper after a lead edge feeder initiates the feed. The feed/pull set accepts the sheet that has been accelerated to machine speed by the lead edge feed system. In some cases, the lead edge feed system transfers the sheet a distance beyond the feed/pull roll nip so that the lead edge feed system and the feed/pull roll nip work in concert to transfer the sheet to the next stage of the finishing machine. That is, the feed/pull roll set transfers the sheet at machine speed to the next hand-off point, which typically may be a vacuum transfer unit, print/impression nip, or a pull roll set nip.

The feed/pull roll set includes upper and lower rolls which are adjustably spaced apart to set up an opening or inter-gap between them that is slightly less than the caliper or thickness of the sheet that is being processed, forming a nip which is sufficiently narrow to grip a sheet without crushing it. To facilitate this process, at least one roller of the feed/pull roll set incorporates an elastomeric cover of a suitable material such as nitrile rubber or urethane. Although the elastomers are tough, durable materials, the abrasiveness of corrugated board sheets causes eventual wear of the elastomers' gripping surface. Since most machines are center justified, the center portion of a feed/pull roll set normally is in contact with the corrugated sheet regardless of the width of the sheet being fed. As a result, the center portion of the elastomer cover surface wears first, with progressively less wear towards the ends of the roll. As the wear continues through subsequent running of corrugated sheets, the elastomer-covered roll starts to exhibit a concave profile.

As the roll set is used and the elastomer cover wears, the concave profile becomes more pronounced and the gripping force generated by the nip pressure starts to diminish, the desired pulling or feeding force is compromised. When this occurs, the elastomer-covered roll typically should be changed to maintain optimum performance of the finishing machine. However, since changing a conventional roll cover requires a time-consuming and thus expensive shut-down of the machine, in many cases instead of changing the cover, the machine operator simply reduces the set-up opening (or gap) in order to increase the roll set impression so as to continue production. However, this can result in poor feeding, excessive crush, and/or poor registration of the sheets being fed into the finishing machine, and is not a satisfactory solution to the problem of cover wear.

As noted above, a elastomer feed/pull roll is traditionally used in conjunction with a steel knurled feed roll in the feed end of most finishing machines in operation today, such as Rotary Die Cutters, Flexo Folder Gluers, and others, and the nip formed by the set of rolls is used to feed/pull corrugated sheets through the machine. Because of the wear problem noted above, the elastomer feed/pull roll is a consumable item, and periodic refurbishment typically requires this roll to be removed from the machine, crated and shipped to a elastomer roll provider/manufacturer for stripping, re-application of elastomer, machining, re-crating and returning the roll to the finishing machine operator for re-installing it in the finishing machine. This process might have to be repeated multiple times per year due to the wear of the elastomer, and is problematic for the machine operator, since the removal of the elastomer feed/pull roll from the machine to refurbish the elastomer requires significant maintenance down time to complete the change-over as well as considerable expenses for handling and refurbishment, and this has a negative impact on the converting process and on the cost of the finished product.

In addition to normal wear, a jam at the feed end of the machine can damage the elastomer gripping surface of feed/pull roll to the extent that the roll is no longer functional, creating an immediate need for a roll replacement. Most finishing machine operators keep a spare roll in inventory as safety stock so that they can pull one roll and install another so as to maintain production, but this does not eliminate the need and expense of refurbishment of the damaged roll.

Industry trends show that newer machines running at higher production rates create accelerated elastomer surface wear, and thus a shorter cycle between replacements of the elastomer feed/pull rolls. Finishing machines are pushing the standard for speed and utilization. At these increased speeds, it is critical to have a roll surface which is of good quality and in full contact with the corrugated sheet being fed so as to maintain control. A worn or damaged roll surface will impact the feeding process by causing jams, slippage of sheets, and/or skewing of sheets, resulting in poor registration and lost production. In a like manner, the additional impression between the roll set that is typically used to compensate for a worn or damaged elastomer feed/pull roll results in excessive crush to the corrugated sheet, which impacts the strength of products made using the corrugated sheets.

Depending on the duty cycle, operational speed, and machine utilization, the feed roll's elastomer gripping surface life in currently-used machines ranges from three months to nine months. It can take two to four hours to swap-out an elastomer feed/pull roll. The overall loss of production and the concurrent cost of elastomer roll replacement and refurbishment is a problem for the industry.

There is a need, therefore, for a corrugated sheet feed system which will facilitate the changing of an elastomer feed/pull roll surface.

OBJECTS AND SUMMARY OF THE INVENTION

Accordingly, it is a primary object of the present invention to overcome the above-mentioned difficulties by providing a replaceable feed and pull roll cover for a finishing machine which will reduce the down time of the machine during elastomer roll cover replacement.

Briefly, the feed roll configuration and method of the present invention includes a feed/pull roll set incorporating an elastomer roll which is made up of a cylindrical roll core and a elastomer cover for the roll core which is made up of a plurality of side-by-side detachable elastomeric (e.g., nitrile rubber or urethane) elongated feed cover sections which each wrap circumferentially about the core. The opposite ends of each of the feed cover sections incorporate locking mechanisms which are inserted into corresponding keyways machined into the roll core surface to secure the cover sections in place. Once wear is significant enough on one or more of the feed cover sections to produce a risk of degraded performance of the elastomer-covered roll, the damaged (identified, selected) feed cover section or sections are removed and new cover sections are installed in their place, without removing the roll from the machine. As opposed to the hours of maintenance previously needed for removing and re-installing entire, intact elastomer feed/pull rolls, the system and process of the present invention provides for installation of a new elastomeric (e.g., nitrile rubber or urethane) surface or a portion of the surface in a replacement or repair method which is readily completed within 30 minutes or less.

As most machines are center-justified, the centermost of the plurality of side-by-side feed cover sections are always in contact with the corrugated sheet, or blank, that is being fed through the machine, so that regardless of the size of the sheets it is the center cover sections that are subject to the greatest wear. The outermost (or endmost) of the side-by-side feed cover sections may or may not be in contact with a given blank being fed, again depending on blank size. Instead of replacing the entire elastomer covering on a roll when only a part of the cover is worn as was previously required, the present invention provides the option of replacing only selected cover sections of those on the roll. The Invention also provides the option of feed-cover rotation, or exchange, where central, or inner feed-cover sections can be moved to outside or outer locations on the feed roll, and outside feed-covers can be moved to inner locations of the roll, to increase elastomer gripping surface life. In addition, the design provides the option of using a reduced number of feed cover sections on a roll to provide only the identified, selected number needed to span a particular sheet or blank size being fed.

In general, then, the invention consists of a finishing machine feed roll which comprises a roll core having at least one longitudinally (or axially) extending locking slot or keyway; at least one elongated, flexible feed cover section incorporating a flexible backing and an elastomeric coating; and locking hardware on opposite ends of the feed cover for engaging a corresponding locking slot to removably secure the feed cover section on the roll core. In a preferred form of the invention, the elastomeric coating for the feed cover is nitrile rubber or urethane. Each feed cover section is installed on the roll by wrapping the section circumferentially around the roll so that the opposite ends of the cover incorporating the locking mechanism abut when the mechanism is inserted in the slot to form an axially extending section end joint. Preferably, the feed roll core incorporates a plurality of longitudinally spaced and circumferentially offset locking slots for receiving and securing a corresponding plurality of elongated feed cover sections. The locking slots are spaced along the length of the roll to position the corresponding sections in close side-by-side relationship and are circumferentially offset around the circumference of the roll so that the end joints of adjoining feed cover sections are circumferentially offset.

The invention further includes a method for refurbishing a previously operating finishing machine which initially incorporated a feed roll having a roll core covered with an elastomeric coating. This new method includes the steps of first removing the feed roll from the machine, stripping the pre-existing (now worn) elastomeric coating from the roll core, and then cleaning the roll core. The method further includes machining or otherwise forming a plurality of longitudinally-extending, circumferentially offset locking slots or keyways on the roll core, and providing a plurality of elongated flexible feed cover sections, with each section having a flexible backing and an elastomeric (e.g., nitrile rubber or urethane) coating and a locking mechanism at each end. The next step of the method includes installing the flexible feed cover sections on the roll core, with the locking mechanisms for each cover section engaging a corresponding keyway to detachably secure the feed cover sections on the feed roll core. Finally, the method includes replacing the now-refurbished feed roll and its new feed cover sections in the machine. With the new feed cover sections in place in the machine, future refurbishment of the feed roll is accomplished simply by replacement of identified, selected detachable feed cover sections which show signs of wear.

To facilitate removal of the feed cover sections from a feed/pull roll, the roll is provided with a core of steel construction with a circular cross-section and incorporates demountable journals. As noted, the roll has a plurality of localized longitudinal keyways to accept the locking mechanisms on opposite ends of a corresponding feed cover section. These keyways are spaced, or offset, around the circumference of the roll so as to minimize the effect of aligned feed-cover joints on the feeding of sheets through the finishing machine. The pattern of the keyways is preferably angularly symmetrical about the roll centerline to balance any effect of the keyways on the roll rotation.

In order to convert worn feed/pull rolls of existing finishing machines to the configuration of the present invention, machine owners send those worn feed/pull rolls to a roll manufacturer or refurbisher for inspection of the worn roll's core to ensure that it is in acceptable condition. If the condition is acceptable, the roll is stripped of its existing worn elastomer cover, keyways are machined to accept the feed-cover sections of the invention, and the refurbished rolls fitted with a set of removable feed-covers and returned for installation. In some cases, the rolls will need to be turned to an appropriate new finished outside diameter, (e.g., when the original elastomer covering was applied to a roughened surface). If an existing feed/pull roll is not available or is not in a condition suitable for use as a refurbished roll core, a new core roll will be used for the conversion. Once an existing core has been modified or refurbished to accept the elastomer feed cover sections of the present invention, or a new replacement core has been purchased which accepts the feed cover sections of the invention, machine owners will be able maintain their finishing machines more rapidly and more economically by simply replacing identified, selected worn feed cover sections as needed without the expense and lost time of swapping a used roll with another which has been re-covered.

The feed cover sections of the present invention are preferably constructed of an elastomer material that is similar to that which has been adhered directly to prior feed/pull rolls. In accordance with the present invention, feed cover sections utilizing an elastomer (e.g., nitrile rubber or urethane) material having the formulation of prior covers or layers, have a somewhat flexible backing material of thin steel or polymer mesh to assure size integrity and to provide a degree of stiffness that will eliminate or at least minimize a wave effect that can occur in a finishing machine roll cover when feeding or transferring sheets or blanks through the machine. The ends of each feed cover section are fitted with a feed roll locking mechanism which includes an inner clamp bar member and an outer slotted clamp bar member, or a male and female member which are designed to fit into roll core keyways, and may use suitable threaded fasteners to assure a secure mechanical connection within the roll core keyway. The feed cover sections are ground to a uniform size, slotted per existing feed/pull roll specifications, and parted to the correct width.

The present invention, then, is directed to improvements in a finishing machine feed/pull roll combination, where the elastomer roll of the combination has a roll core with a cylindrical surface having at least one longitudinally extending keyway configured as a locking slot and at least a first flexible feed cover section. This feed cover section incorporates a flexible backing or substrate which carries an elastomeric outer gripping surface, and has first and second locking components on its opposite ends which engage a corresponding locking slot to mount and removably secure the feed cover section onto the surface of the roll core. In preferred embodiments, the feed roll core incorporates a plurality of longitudinally spaced and circumferentially offset locking slots for mounting and securing a corresponding plurality of side-by-side feed cover sections on the roll core.

The elastomer gripping surface or elastomeric coating of the feed cover is preferably molded onto a flexible thin steel backing substrate from an elastomer such as nitrile rubber or urethane, and each feed cover section defines a gripping surface having multiple parallel feed grooves extending between the ends and along the length of the feed cover section to encircling the feed roll when mounted on the roll core.

In one example, the present invention incorporates an elastomer (e.g., nitrile rubber or urethane) covered feed roll assembly as part of a feed/pull roll set combination (e.g., similar to 36) in a sheet finishing machine (e.g., 12), where a roll core has a cylindrical surface with multiple longitudinally spaced and circumferentially offset elongated axially aligned slots or keyways each configured as a locking slot. Multiple replaceable flexible feed cover sections are removably installed on the roll, each incorporating the flexible backing and elastomeric coating and each having first and second locking components on its opposite ends for releasable attachment to the roll core.

The locking components releasably attaching each feed cover section may comprise at a first end a slotted clamp bar and at a second end a clamp bar configured to cooperate with the slotted clamp bar and receive first and second bolts or threaded fasteners which are threadably received in threaded bores in the roll core's locking slot corresponding to the feed cover section to mount and removably secure each feed cover section on the surface of the roll core, where each of the keyways draws together the opposite ends of its cover section to form an end joint. On the roll core surface, the keyways are preferably radially arrayed and spaced along the length of the roll core to mount each identified, selected replacement feed cover sections in side-by-side abutting relationship on the roll core in a manner which is circumferentially offset from the abutting feed cover section to space the end joints around the circumference of the roll core.

Each feed cover section has a width (W) substantially the same as the length (94) of its corresponding keyway and a length (L) sufficient to encircle the circumference of the roll core. Each feed cover section's flexible backing is an elongated inner support member of a flexible material including, but not limited to, thin steel (e.g., approx. 0.018" thick) or polymer mesh which tightly wraps around the roll core's exterior surface, when mounted.

In another aspect, the invention is directed to a method for refurbishing a feed/pull roll set (e.g., 36) in a finishing machine (12) incorporating a feed roll (32) having a roll core (50) covered with a elastomer coating. The method consists of removing the feed roll 32 from the machine; stripping the elastomer coating from the roll core; cleaning the roll core; forming a plurality of longitudinally-extending, circumferentially offset locking keyways on the cleaned roll core; providing a plurality of flexible feed cover sections having the flexible backing carrying the elastomer coating, and attaching or affixing the replaceable flexible feed cover section locking mechanisms to the roll core's locking keyways. The method further includes installing identified, selected flexible feed covers on the roll core, with the locking mechanisms for each cover engaging corresponding keyways to detachably secure the feed covers in abutting side-by-side relationship on the roll cover. If the roll core is to be completely refurbished or repaired, the roll core's entire surface is covered with replaceable flexible feed cover sections, and the refurbished feed roll with the feed covers is re-installed in the machine, whereby future refurbishment of the feed roll is accomplished by replacement of selected detachable feed covers.

The benefits of the feed roll structure of the present invention, as described above, and of the method or process for refurbishing feed/pull rollers include:

- The favorable differential between (a) the cost of refurbishing or resurfacing identified, selected replacement feed cover sections vs. (b) the cost of (prior art) replacing entire elastomer feed/pull rolls or their entire covers;
- The labor savings realized in the time required to swap out a feed cover section vs the time required to replace or refurbish an entire prior art elastomer roll cover, i.e., feed cover sections vs entire roll cover;

The ease of maintaining the performance of a feed/pull roll set:
 minimizing board crush
 maintaining specified feed registration
 eliminating sheet skew
Savings of the cost of crating rolls;
Savings of the cost of transporting rolls;
Inventory and handling savings, i.e., costs for a box of feed cover sections vs. spare elastomer roll; and
Savings produced by improved planning/scheduling time to replace feed cover sections vs. resurfacing elastomer feed/pull rolls.

The foregoing objects and features of the present invention are achieved individually and in combination, and it is not intended that the present invention be construed as requiring two or more of the features to be combined.

BRIEF DESCRIPTION OF THE DRAWINGS

The above and still further objects, features and advantages of the present invention will become apparent upon consideration of the following detailed description of a specific embodiment thereof, particularly when taken in conjunction with the accompanying drawings, wherein like reference numerals in the various figures are utilized to designate like components, wherein.

DESCRIPTION OF THE PREFERRED EMBODIMENT

Figure 1:
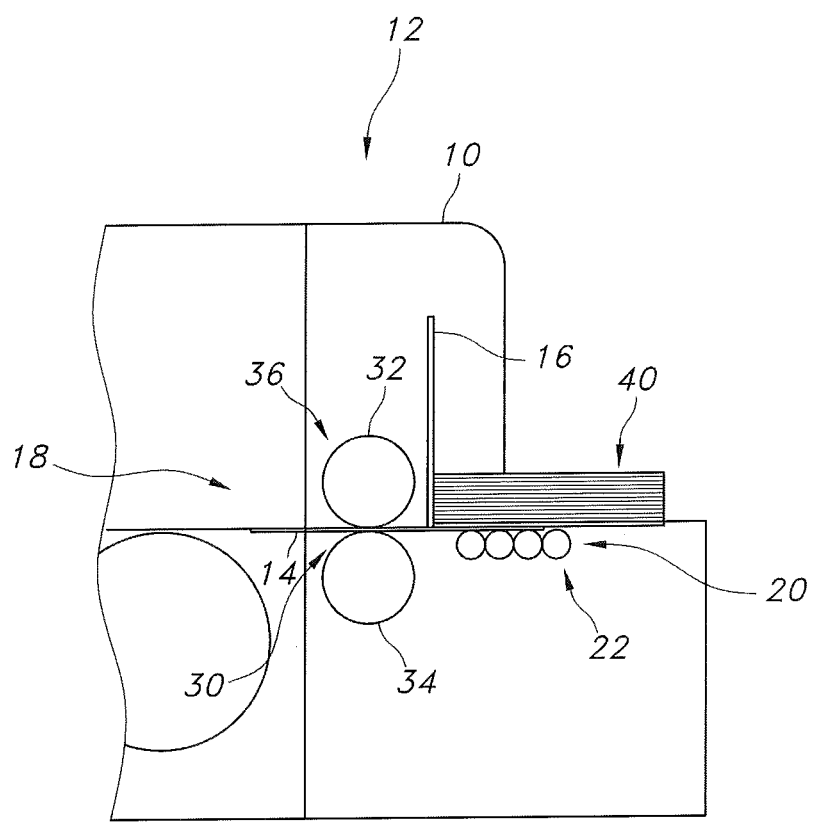
FIG. 1 is a diagrammatic side view of the feed end portion of a typical finishing machine for feeding corrugated sheets from a hopper to following machine sections.

Turning now to a more detailed description of the present invention as illustrated in FIGS. 2-9H, the process of converting sheets of, for example corrugated board or cardboard (or other suitable material), from a blank sheet into a useable form such as a shipping container, produce tray, shelf ready packaging, or the like, starts with the feed end section 10 of a converting, or finishing machine 12 (e.g., as illustrated diagrammatically in the side view of FIG. 1). As there illustrated, blank sheets 14 are fed from a hopper 16 through the feed end section 10 into following conventional finishing machine sections 18. The feeding process typically uses a lead edge feeder 20 incorporating a set of feeder wheels 22 which deliver sheets 14 one at a time into a nip 30 between an upper elastomer covered feed roll 32 and a lower knurled steel feed roll 34. The rolls 32 and 34 comprise a feed/pull set generally indicated at 36, with the elastomer feed/pull roll 32 in particular being the focus of this invention.

The function of the feed/pull roll set 36 is to grip a sheet 14 in the nip 30 with sufficient force to pull it out from the bottom of a stack 40 in hopper 16 after the lead edge feeder 20 and feeder wheels 22 initiate the feed, to accelerate the sheet to machine speed, and then to traverse it through the feed/pull roll nip 30, and in some cases a distance beyond the feed/pull roll nip. The feed/pull roll set 36 continues to transfer the sheet at machine speed to the next hand-off point in the following machine section 18, which may be a vacuum transfer unit, a print/impression nip, or a pull roll set nip as is conventional. The upper and lower feed/pull roll set, or combination 36 is adjustably secured in the converting or finishing machine 12 to allow adjustment of the distance between the rolls 30 and 32R. This distance or opening (gap) between the rolls forms the nip 30, which spans the length of the rolls and thus the lateral width of the path of the sheet 14. The gap is set to be slightly less than the caliper or thickness of the sheet or board 14 that is being processed so as to grip the sheet but not crush it.

The improved upper feed/pull roll assembly 32R of the present invention is part of a feed/pull roll set 36 in the system of the invention and is illustrated in greater detail in FIGS. 2-6, to which reference is now made. Improved Feed Roll Assembly 32R consists of a cylindrical core roll 50 and one or more detachable elongated feed cover sections, three of which are generally indicated at 52, 54 and 56, each of which wraps circumferentially about the cylindrical outer surface 60 of, and is secured to, the core 50. The feed/pull roll assembly 32R of the invention may be a replacement for currently-used original equipment rolls in a finishing machine, wherein the original feed roll (e.g., prior art roll 32) is constructed of a core roll with a elastomer layer bonded to its outer surface, or may be itself original equipment for new finishing machines. The core 50 of the roll 32R according to the invention is a cylindrical steel roll of a length and diameter based on the size and width of the finishing machine 12. If the roll 32R is a replacement it will have a core diameter that is approximately 1.00" less than the design diameter of the original equipment elastomer roll 32 which it is to replace in the assembled feed/pull roll set 36. This smaller diameter is provided to accommodate the thickness of the replaceable feed cover sections (e.g., as illustrated in FIGS. 9A-9H) which will be used instead of the prior elastomer covering. If the improved elastomer covered feed roll assembly 32R of the present invention is original equipment, it will have the appropriate length and diameter for the machine design.

Figure 2:
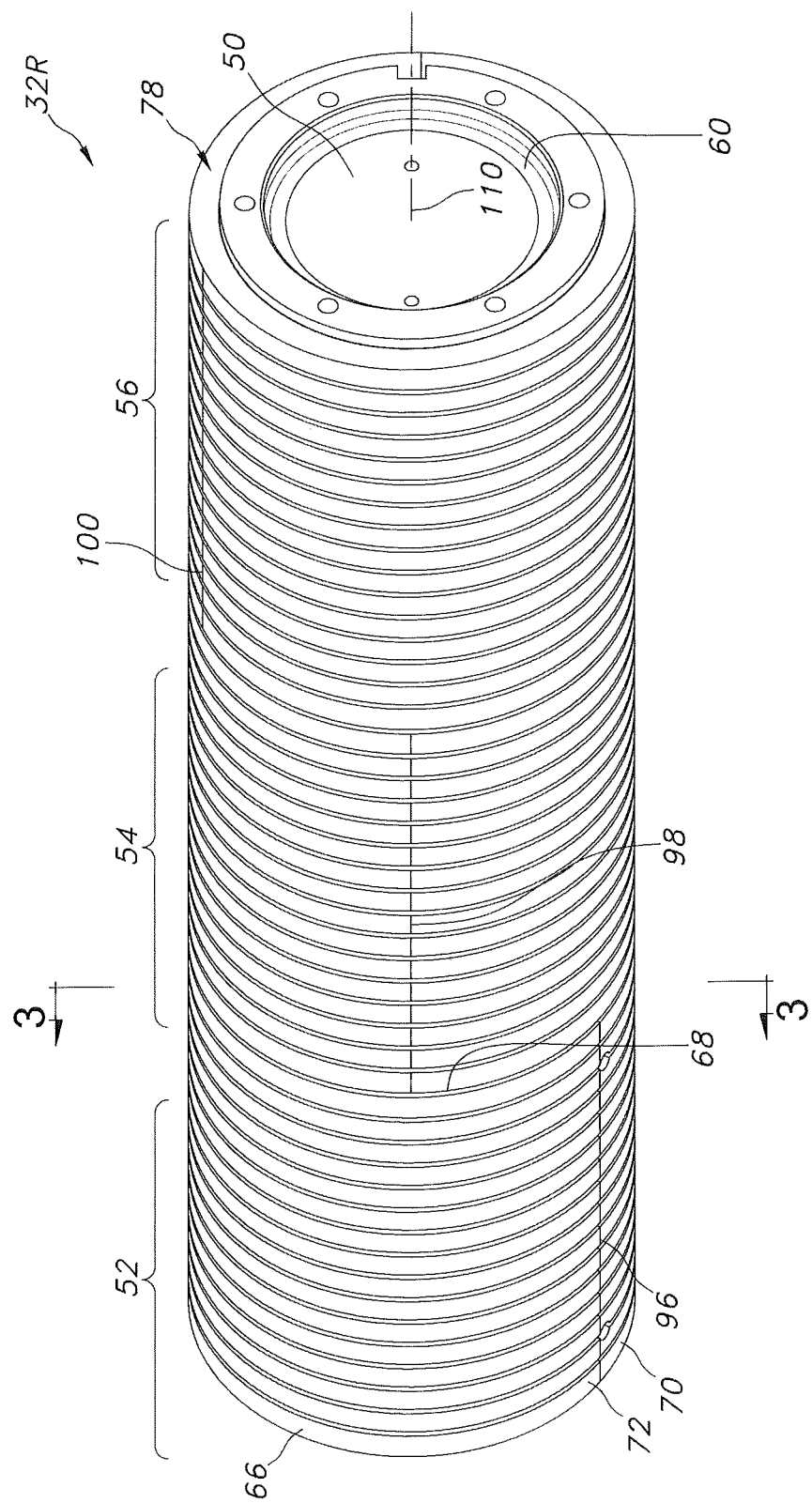
FIG. 2 is a diagrammatic perspective cutaway end view of a portion of a finishing machine elastomer feed roll incorporating a plurality of removable feed roll cover sections in accordance with the present invention.
Figure 3:
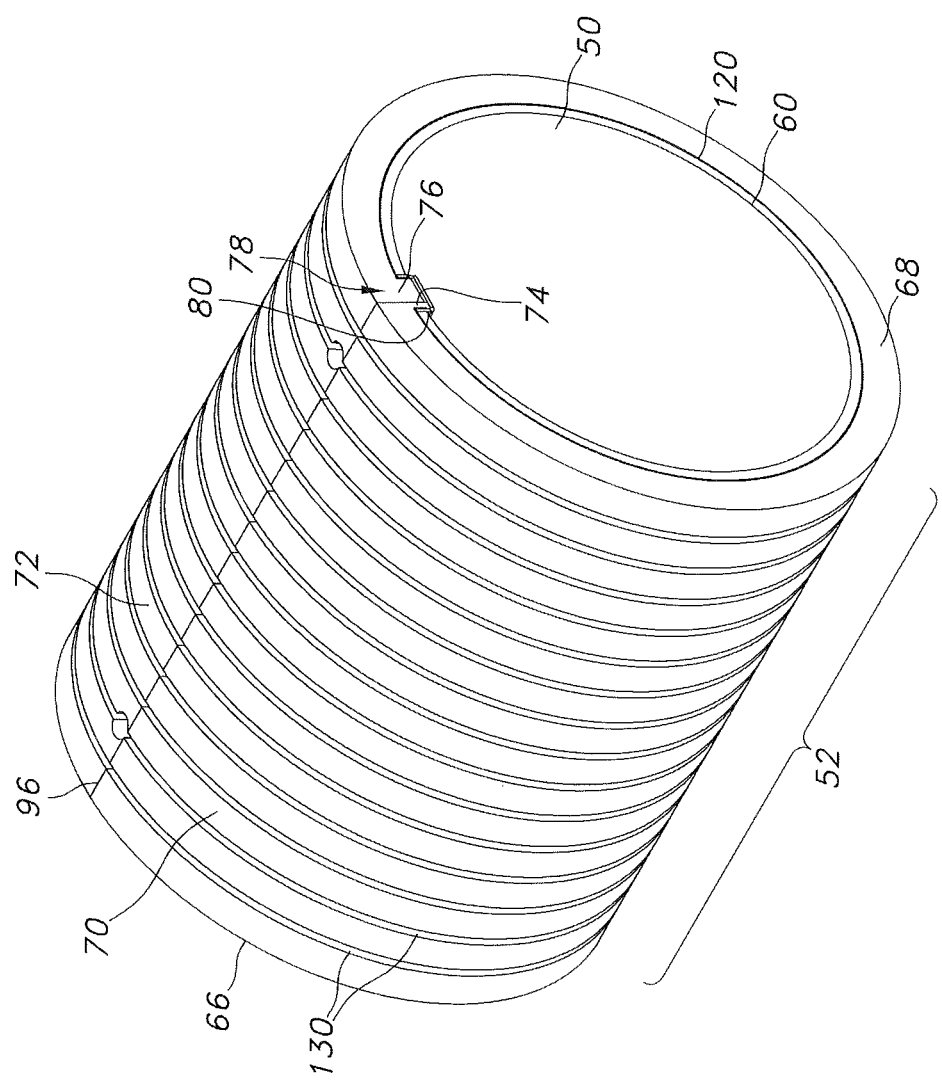
FIG. 3 is a diagrammatic perspective sectional end view of a portion of the finishing machine feed roll of FIG. 2, taken along line 3-3 of FIG. 2 and illustrating an endmost removable feed cover section on a roll core in accordance with the present invention.
Figure 4:
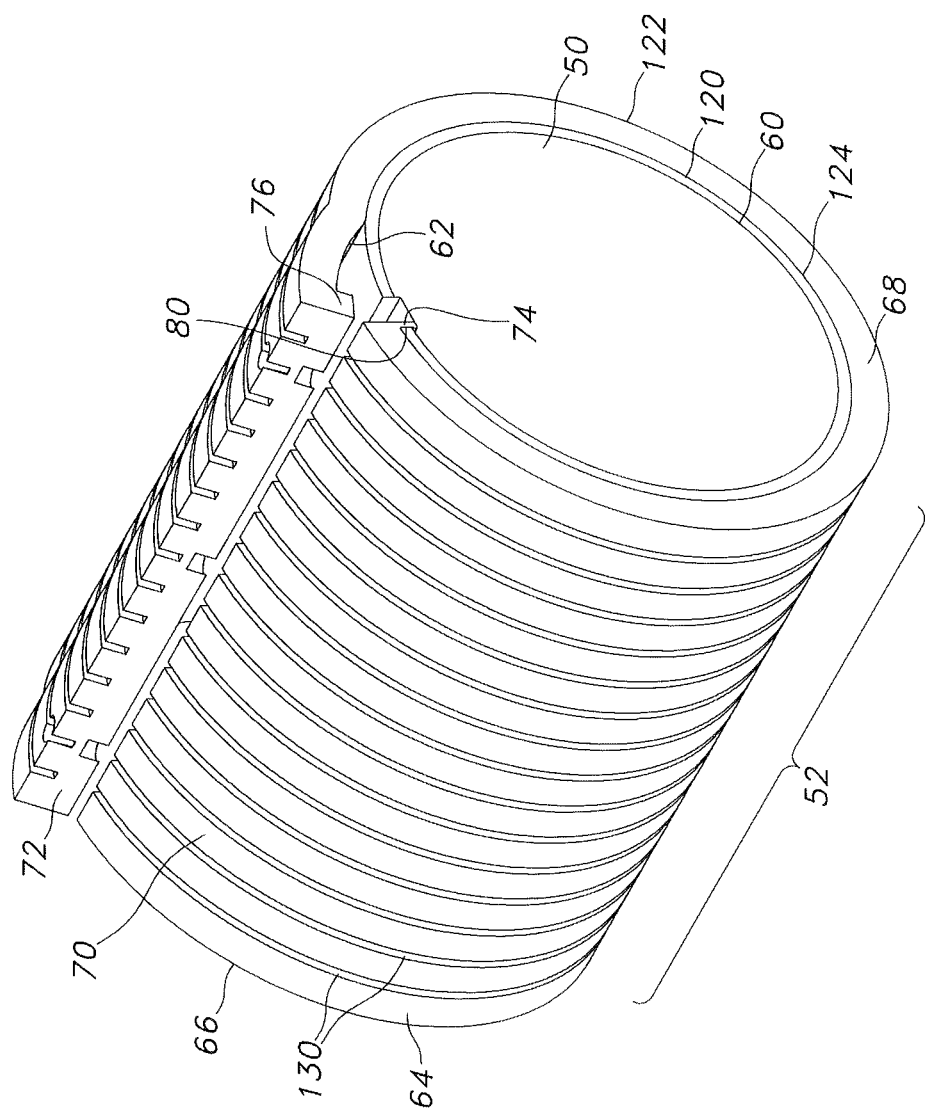
FIG. 4 is a diagrammatic perspective end view of the feed roll portion of FIG. 3, with its feed cover section partially removed.
Figure 5:
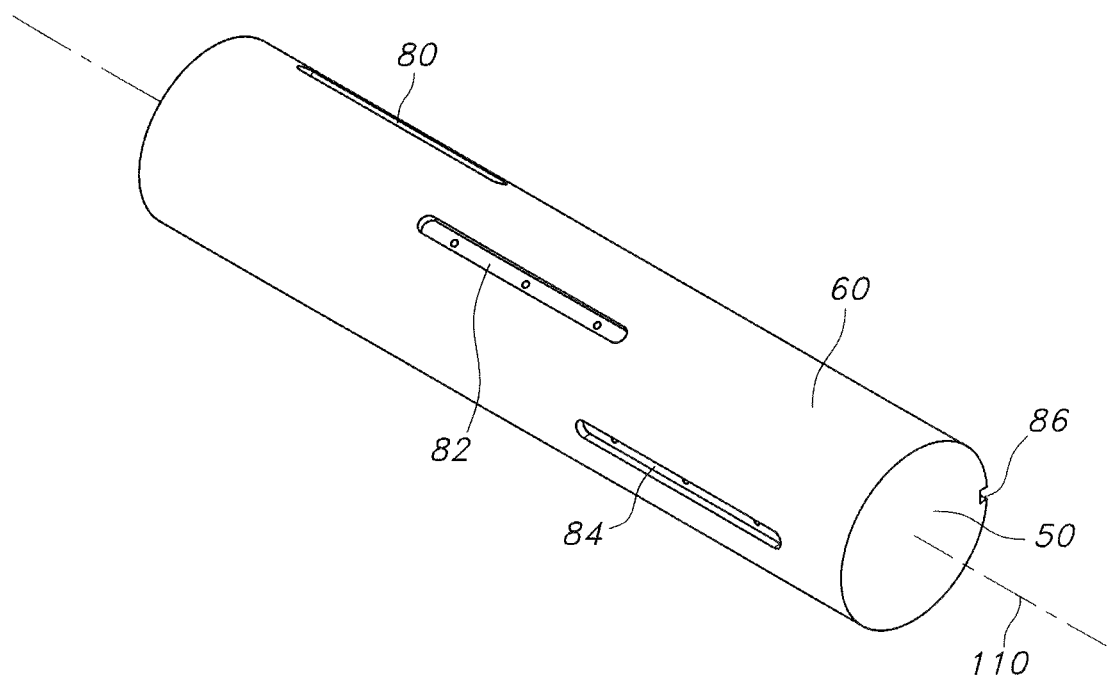
FIG. 5 is a diagrammatic perspective sectional end view of the finishing machine roll core of the device of FIGS. 2-4, in the absence of feed cover sections.

In the illustrated exemplary embodiment of the improved elastomer covered feed roll assembly 32R of the invention, the roll core 50 carries a plurality of feed roll cover sections, three of which are illustrated in the sectional view of FIGS. 2 at 52, 54 and 56 and which wrap around the outer circumference 60 of the roll core. Although three are illustrated, it will be understood that additional feed roll cover sections may be positioned in close side-by-side relationship along the length of the core 50, with one embodiment, to be discussed below, including 11-13 cover sections. Each cover section is generally rectangular, having inner and outer surfaces 62 and 64, opposite sides 66 and 68 defining the width W of the cover section, and opposite ends 70 and 72 defining the circumferential length L of the cover section (see FIG. 8). When a cover section such as section 52 is being installed on the core 50, as illustrated in FIG. 4 and when on the core as illustrated in FIGS. 2 and 3, the inner surface 62 of the cover section is placed in contact with the outer surface 60 of the cylindrical core 50 and the section is wrapped around the core. The circumferential length of the cover section 52 is of sufficient length to bring the opposite ends 70 and 72 into abutment with each other, as illustrated in FIGS. 2, 3, 4 and 6. The side walls 66 and 68 extend circumferentially around the cylindrical roll 50, and the abutting end walls extend longitudinally along the roll, parallel to the axial length of the roll. The opposite ends 70 and 72, respectively, of the roll cover section 52 incorporate first and second locking shoulder components 74 and 76 of a locking mechanism generally indicated at 78 (see, e.g., FIGS. 3 and 4). The locking mechanism for feed cover section 52 is secured in a corresponding longitudinally extending slot, or keyway 80.

Figure 6:
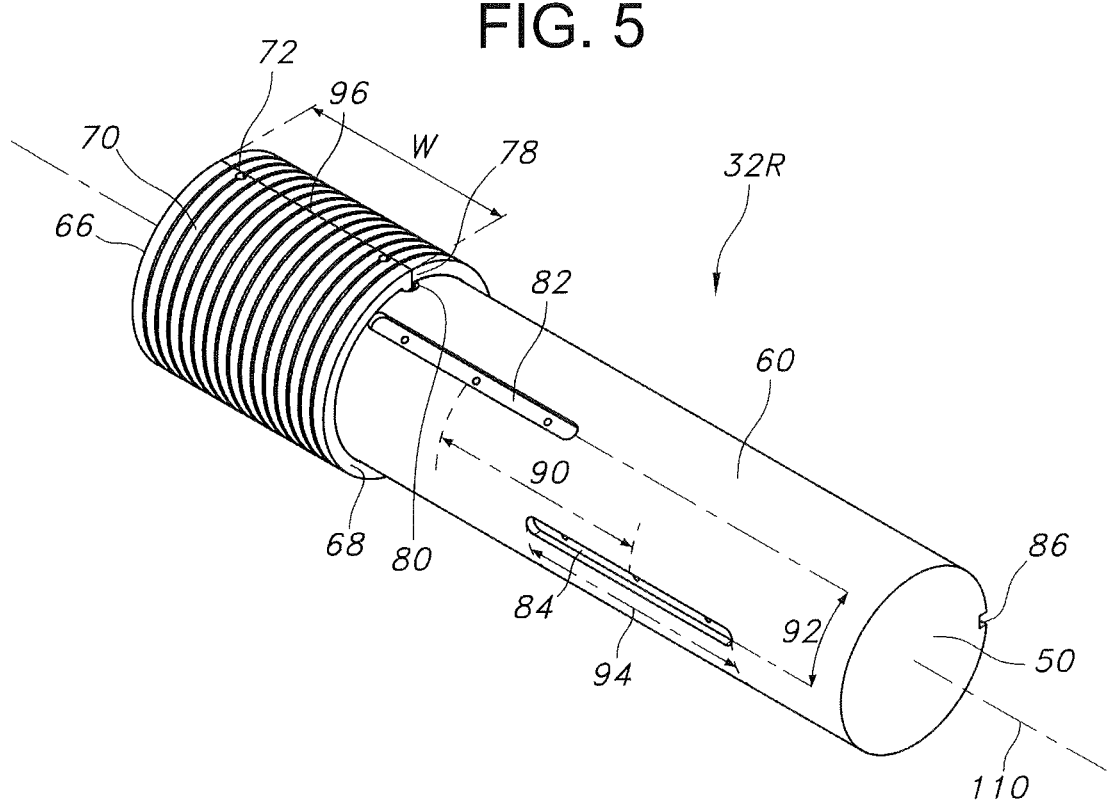
FIG. 6 is a diagrammatic perspective end view of the finishing machine roll core of FIG. 5, with all but a single feed cover section removed, to illustrate longitudinally spaced and circumferentially offset keyways in the roll core for receiving and securing plural feed cover sections.

When multiple feed cover sections such as sections 52, 54 and 56 are provided, the locking mechanism for each cover section is secured in a corresponding keyway, such as the elongated keyways 80, 82, 84 and 86 illustrated in FIG. 6. These keyways may be machined or otherwise formed in the outer cylindrical surface 60 of roll core 50 in a longitudinal (or axially aligned) direction, parallel to the central axis of the core 50, and are configured as locking slots for receiving corresponding cover section locking mechanisms. Although three cover sections and four keyways are herein illustrated, it will be understood that a corresponding keyway is provided for each feed cover section mounted on a given improved elastomer covered feed roll assembly 32R. These keyways are longitudinally spaced, as indicated at 90, with adjacent keyways being on approximately 10.00" centers along the length of the roll 50 in one embodiment of the invention. In addition, the keyways are circumferentially, or angularly, offset around the roll, as indicated at 92 in FIG. 6; that is, each keyway is offset around the circumference of the roll with respect to adjacent keyways, as illustrated. The axial length 94 of each keyway is substantially equal to the width of its corresponding feed cover section and to the axial length of the locking mechanism 78 mounted across the width of the cover section that it is to receive.

For example, for 10" wide cover sections the keyways are 10" long, with the keyways being equally spaced along the length of the roll core so as to position the corresponding feed cover sections in side-by-side abutting relationship, as illustrated in FIG. 2 with the side wall 68 of one cover section abutting the sidewall 66 of the next adjacent cover section. Alternatively, a small gap or axial spacing between adjacent replaceable flexible feed cover sections may be provided. The angular spacing, or offset, of the keyways around the circumference of the roll core causes the feed cover section end joints, indicated in FIGS. 2 at 96, 98 and 100 where the respective ends 70 and 72 of the respective cover sections meet, to be also offset around the circumference of the feed roll to minimize the effect of these joints on the feeding operation of the finishing machine. Further, the longitudinal spacing and circumferential offset provide a keyway pattern that is symmetrical about the roll centerline or axis 110 to balance the roll and reduce the effect of the keyways on roll rotation. For example, in one embodiment of the invention, a 7.00" diameter improved elastomer covered feed roll assembly 32R may be 110" in length, and may carry eleven keyways each 10" in length and spaced 10" on center along the length of the roll core to receive and secure eleven feed cover sections each having a width (or axial dimension) of 10.00".

The preferred elastomer gripping surface or cover material for improved elastomer covered feed roll assembly 32R is preferably a rubber-like composition which, in its finished cured state provides a tough, resilient durable gripping surface having a durometer in the range of 25 to 35, and preferably 30. The elastomeric coating or layer 122 for the feed cover may be molded-in situ onto the flexible backing member 120, or may cast and then bonded to the flexible backing member 120, either with the textured surface and grooves 130. Alternatively, the elastomeric coating or layer (122) may be molded in situ or cast and bonded and then the grooves 130 and surface texture may be added by shaping, cutting or machining processes.

The elastomeric coating or layer 122 is a tough, durable material, but with continuous operation, over time, the abrasiveness of corrugated boards 14 causes eventual wear of the elastomer gripping surface. Because finishing machines are typically center-justified so that each sheet being fed is centered on the feed/pull roll set 36, the center section of the feed/pull roll set is always in contact with the corrugated sheet, regardless of the width of the board being fed, while end sections of the set may be used less often, for example only for wider sheets. As a result, the center section of the elastomer gripping surface wears first, with progressively less wear towards the ends of the roll. As the wear continues through subsequent feeding of corrugated sheets, the roll set starts to exhibit a longitudinal concave profile, with the spacing between the rolls 32 and 34, for example, becoming greater at the center than at the ends (as noted above). At some point in the wear process, the gripping force generated by the nip pressure of the feed/pull roll set starts to diminish at the center, resulting in uneven forces on the sheets being fed, and in the method of the present invention that center section's wear is identified for subsequent repair or refurbishment. At this point, the elastomer feed roll cover should be changed to maintain optimum performance. In prior systems, the difficulty and expense of refurbishing a feed roll cover led, in many cases, to operators simply reducing the set-up opening (gap) to increase impression so as to continue production, resulting in poor feeding, excessive crush, and/or poor registration.

In accordance with the present invention, identified sections of the worn feed roll selected for repair or refurbishment by installation of one or more replaceable flexible elastomer coated feed cover sections (e.g., 52) which easily and quickly provides a new, fresh elastomer surface for an improved elastomer covered feed roll assembly 32R as needed to maintain optimum roll performance, and ultimately optimum machine performance. The replaceable cover system eliminates the need to remove the entire roll (e.g., 36) from the machine (e.g., 12) and eliminates the associated costs of that sort of removal and refurbishment. In addition, the scheduling time for maintenance is reduced from days to minutes so the finishing machine operator can be more responsive to roll performance degradation to maintain proper machine performance.

Figure 7:
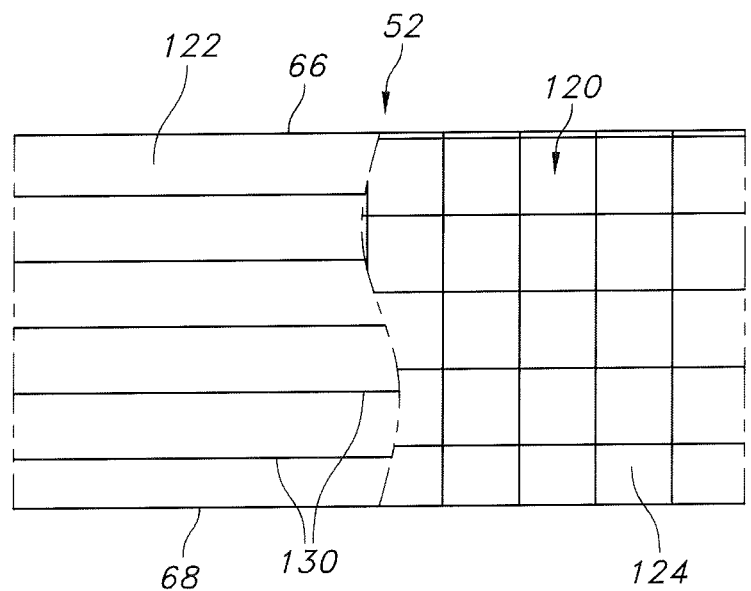
FIG. 7 is a partial top plan cutaway view of a feed cover section.
Figure 8:
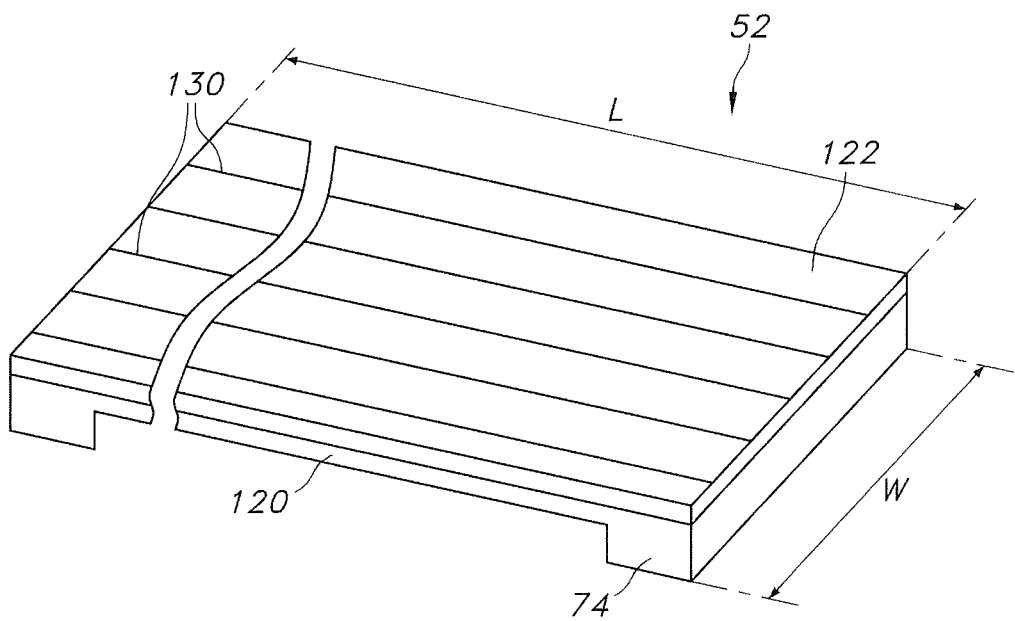
FIG. 8 is a partial perspective end view of the feed cover of FIG. 7.

As illustrated in the partial cutaway view of FIG. 7 and the partial perspective view of FIG. 8, each feed cover section, such as the feed cover section 52 shown in FIGS. 3 and 4, consists of elongated inner support member or substrate 120 made of a thin flexible material such as steel (e.g., ~0.018" thick) or a polymer mesh. In the exemplary embodiment of the invention illustrated in FIGS. 2-9H, the support member or feed roll cover backing 120 preferably is approximately 10.00" in width between the cover section side edges 66 and 68 and is long enough to reach around the circumference of the roll core 50 with its ends abutting at joint 96 (FIG. 3) when installed. A grooved elastomeric (preferably nitrile rubber or urethane) layer 122 approximately 0.50" in thickness is preferably molded upon or cast onto and permanently applied or bonded onto outer surface 124 of the inner support member 120 using best practices for elastomer molding/manufacturing. The elastomer is cast, molded or shaped to the desired finished thickness or is molded or cast to be over-size and is shaped or machined to the finished thickness and texture. Alternatively, elastomeric layer 122 may be fabricated from cut sheets of Sheet Rubber material made from EPDM Rubber, Natural Gum Rubber, Neoprene Rubber, Nitrile Rubber, Recycled Rubber, Silicone Rubber or Synthetic Rubber. In considering the most recent development work and the most likely future needs, synthetic nitrile rubber compounds appear most promising. The nitrile rubber is a mixture of components which is cured in an autoclave to achieve a selected hardness (e.g., Shore A durometer hardness) of e.g. 35 after curing, so a finished elastomeric layer 122 is preferably 30+/−5 (Shore A). Softer and harder nitrile rubber materials are available (e.g., 25, 45, 55, 70 Shore A) and these could applied on a roll as a single durometer or as a dual durometer layers (with, e.g. dual durometer layers of 25/55 or 35/55).

As previously noted, the opposing ends 70 and 72 of the feed cover sections are all fitted with suitable locking mechanisms 78 each incorporating components 64, 66 on the opposing ends of the section. These components may be conventional inner and outer lock members or male and female lock members. The locking mechanism fits into its corresponding roll core keyway as diagrammatically illustrated in FIGS. 3 and 4 to secure the feed cover section onto the roll core surface so that the roll core and the feed covers will rotate as one system. The lock may use suitable hardware to assure a secure mechanical connection within the roll core keyway.

Figure 9A:
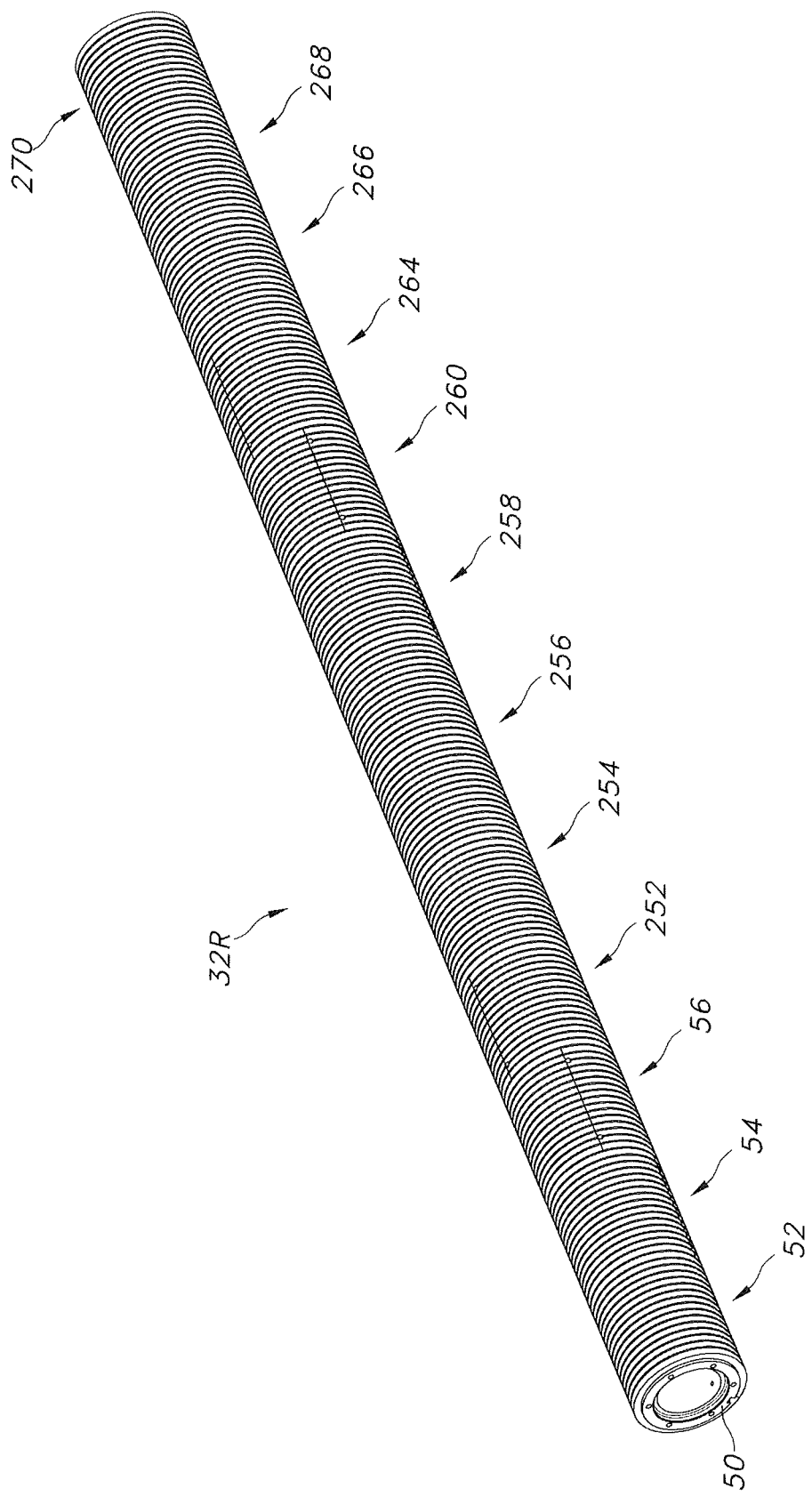
FIGS. 9A and 9B illustrate a feed roll assembly including thirteen (13) feed cover segments, in accordance with the present invention.
Figure 9B:
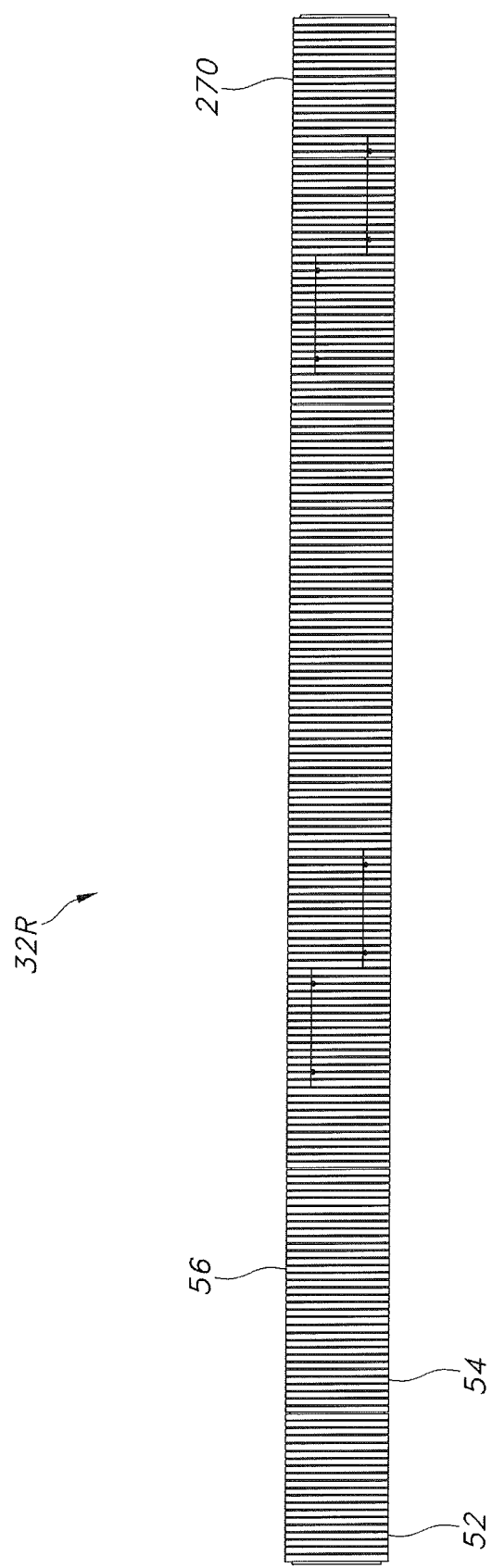
Figure 9C:
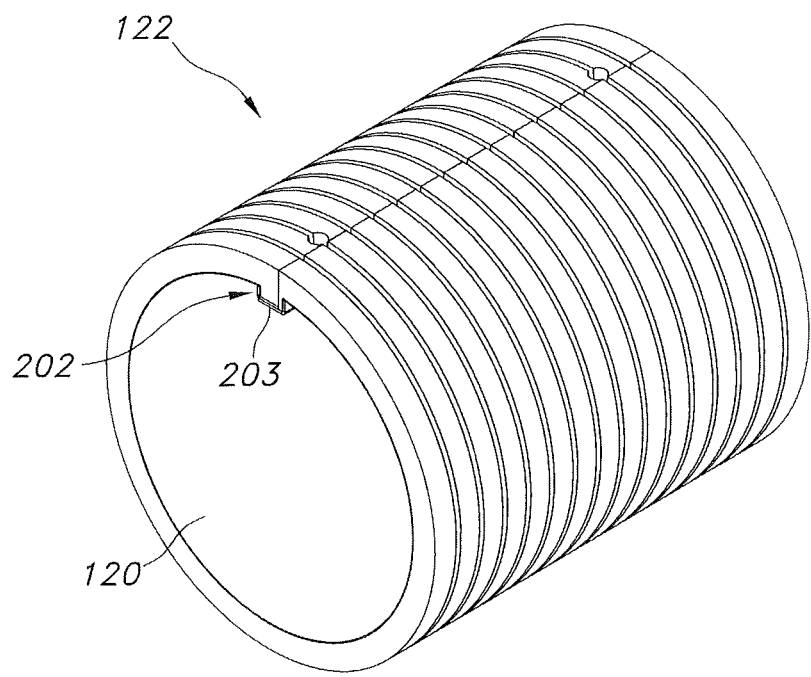
FIGS. 9C-9H illustrate an exemplary the feed cover segment as used in the feed roll assembly of FIGS. 9A and 9B, in accordance with the present invention.
Figure 9D:
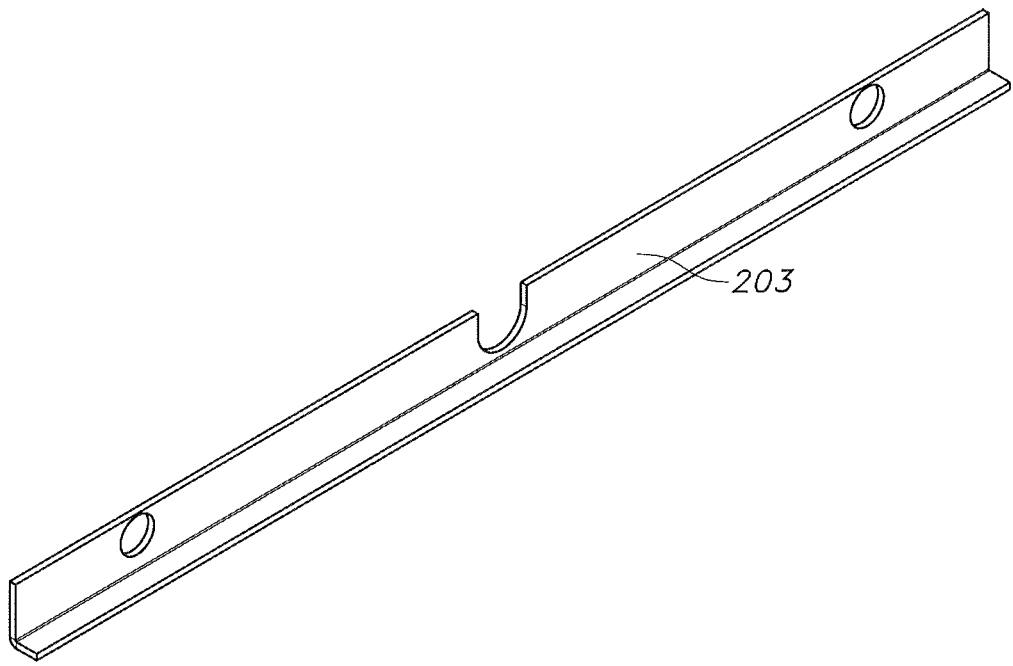
Figure 9E:
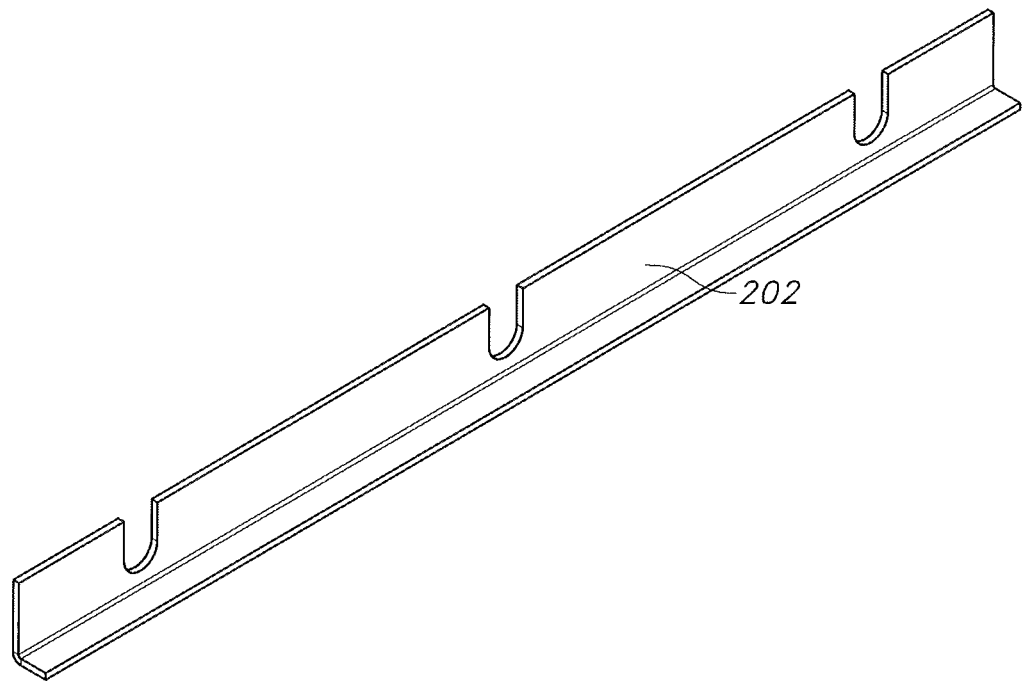
Figure 9F:
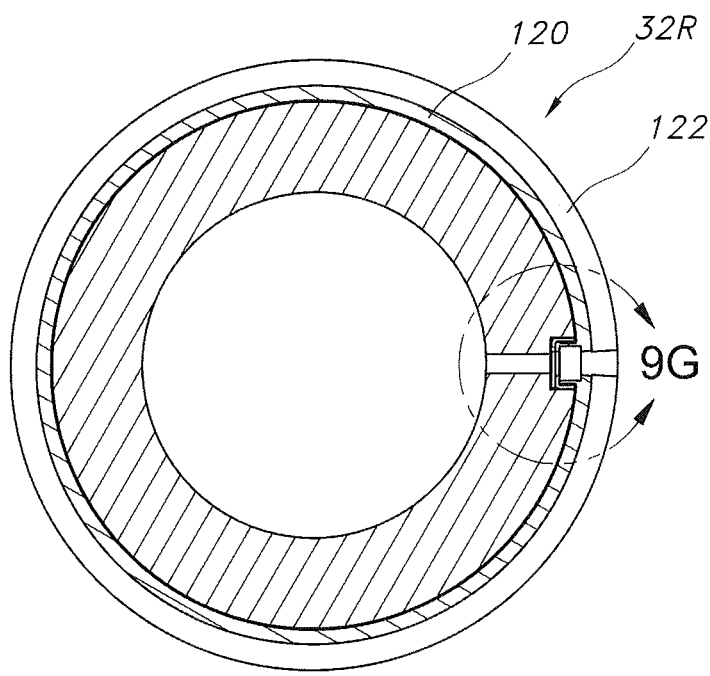
Figure 9G:
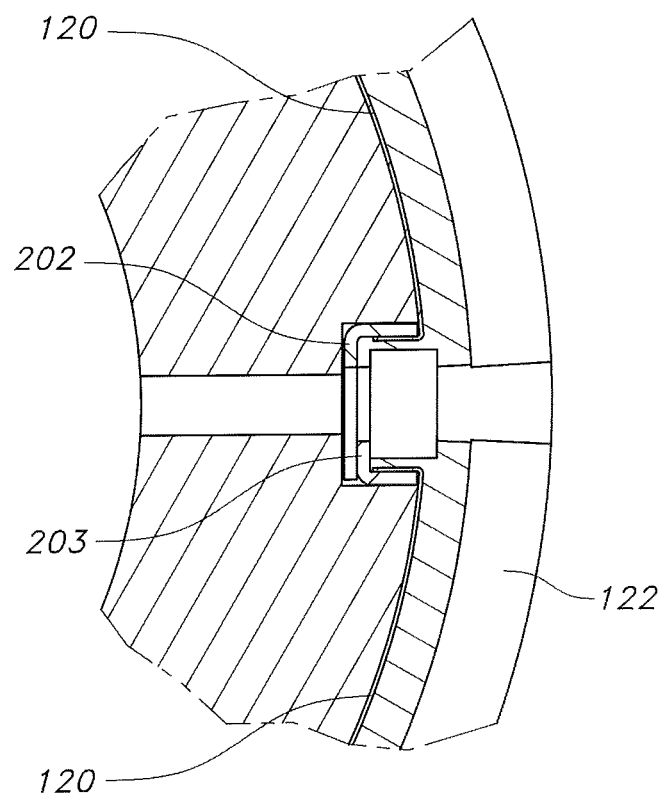

Alternatively, as illustrated in FIGS. 9A-9H, the locking components 74, 76 of each feed cover section may comprise at a first end a slotted clamp bar 202 and at a second end a clamp bar 203 configured to cooperate with the slotted clamp bar 202 and receive first and second bolts or threaded fasteners which are threadably received in threaded bores in the roll core's locking slot (e.g., 80, 82, 84, 86) each corresponding to the feed cover section to mount and removably secure each feed cover section on the surface of the roll core, with each of the keyways drawing together the opposite ends (70, 72) of its corresponding cover section to form an end joint (96), the keyways being spaced (90) along the length of the roll core to mount the identified, selected replacement feed cover sections in side-by-side abutting relationship on the roll core and being circumferentially offset (92) to space the end joints around the circumference of the roll core. FIGS. 9A and 9B illustrate an improved feed roll assembly 32R including thirteen (13) feed cover segments (e.g., 52, 54, 56, 252, 254, 256, 258, 260, 262, 264, 266, 268, 270), in accordance with the present invention.

Longitudinal feed grooves 130 extend along the length of the external gripping surface of each replaceable flexible feed cover section (e.g., 52), in compliance with feed/pull roll standards, and extend circumferentially around the improved elastomer covered feed roll assembly 32R when the cover sections are installed on the roll core 50, as illustrated in the Figures. These gripping slots or grooves are either formed during the elastomer gripping surface molding or casting process or are machined or shaped into the elastomer gripping surface after formation of the cover. When a cover section (e.g., 52) is installed, the opposite ends of the cover abut at 96 to form a joint extending across the width of the cover and extend in a direction lengthwise, or axially, along the improved elastomer covered feed roll assembly 32R, as illustrated. The end joint for each cover marks the location of its corresponding keyway, and thus the joints in adjacent covers are circumferentially offset, as illustrated at joints 96, 98 and 100 in FIG. 2. The feed cover sections (e.g., 52, 54, 56, etc.) are somewhat flexible due to the properties of the elastomer layer 122 and the thin inner member 120. In their unmounted, relaxed state, they are curved, or arcuate, bearing a resemblance to a major arc of a circle with a radius of curvature that facilitates mounting on the roll core 50. In their mounted state, the feed cover sections completely wrap around the roll core, 360 degrees. The two opposite ends of the feed cover section meet at the roll core keyway to create the tight joint 96.

As discussed above, the advantages and benefits of the improved elastomer covered feed roll assembly 32R of the present invention, and of the process for refurbishing feed/pull rollers include:

The favorable differential between the cost of replacement feed cover sections vs. the cost of entire elastomer feed/pull roll covers;

The labor savings realized in the time required to swap out an identified, selected feed cover section (e.g., 52) vs the time required to refurbish a elastomer roll cover, i.e., feed cover sections vs entire roll cover;

The ease of maintaining the performance of a feed/pull roll set:
  minimizing board crush
  maintaining specified feed registration
  eliminating sheet skew Savings of the cost of crating rolls;

Savings of the cost of transporting rolls;

Inventory and handling savings, i.e., costs for a box of replaceable flexible feed cover sections vs. keeping an entire spare prior art elastomer covered roll (e.g., 32); and Savings produced by improved planning/scheduling time to identify and replace one or more selected replaceable flexible feed cover sections vs. resurfacing an entire spare prior art elastomer covered feed/pull roll (e.g., 32).

To utilize the improved elastomer covered feed roll assembly 32R of the invention in existing finishing machines (e.g., 12), a machine owner/customer ships a used roll (e.g., 32) that is to be refurbished to the roll manufacturer or supplier, who will inspect the roll to assure it is in good condition. Once a satisfactory condition is established, the roll is stripped of the worn elastomer surface, cleaned, and turned to a specific diameter if necessary. Keyways (e.g., 80, 82, 84) are milled in the specific locations required for installation of the replaceable flexible feed cover sections of the invention, and the roll is then fitted with a complete set of feed cover sections to provide an improved elastomer covered feed roll assembly 32R, where the number of replaceable flexible feed cover sections (e.g., 52) will depend on the roller dimensions. If the customer does not have a used roll to use as a core, a new roll will be produced to the specifications referenced above. At an opportune time, the customer then swaps out the worn elastomer feed roll 32 and installs the new improved elastomer covered feed roll assembly 32R of the present invention. After the new improved elastomer covered feed roll assembly 32R is installed and used, the elastomer gripping surface can be examined, and if excess wear is discovered or identified, selected sections can be easily refurbished or completely replaced simply by changing out selected replaceable flexible feed cover sections, or all of the replaceable flexible feed cover sections, as needed.

The replaceable flexible feed cover sections (e.g., 52) on improved elastomer covered feed roll assembly 32R are affixed in place with threaded fasteners (see e.g., FIG. 9H) and they are flexible, so they can be removed by removing the outer locking hardware (e.g., such as bolts or threaded fasteners 250) prying the outer locking component of the lock mechanism from the inner locking component (similar to an anvil cover), then removing the hardware from the inner locking component. The replaceable flexible feed cover section can then be pulled off the core. Each replaceable flexible feed cover section to be replaced can then be successively removed in the same manner. A new set of replaceable flexible feed cover sections is installed in opposite steps, i.e., a feed-cover is wrapped or threaded around the roll core 50, the inner locking component is inserted in the keyway, a fastener locks it in place, and the outer locking component is forced into the keyway creating an interference fit, and two fasteners 250 are then used to lock the feed cover section (e.g., 52) in place. Each successive replaceable flexible feed cover section is installed in the same manner. Other locking arrangements are possible.

Persons of skill in the art will recognize that the system and method of the present invention as described above and illustrated in FIGS. 1 (for context) and 2-9H provides an improved repair refurbishing method for retrofitting an improved elastomer covered feed roll assembly 32R onto a machine (e.g., 12) with a feed/pull roll set (e.g., 36) where operators have operated the feed/pull roll set (36) for an operation interval having a duration long enough to cause significant wear to the elastomer gripping surface of one or more replaceable flexible feed cover sections in an identified section (e.g., the center) of the improved elastomer covered feed roll assembly 32R. The operator or machine owner identifies the replaceable flexible feed cover sections which have accrued the excessive wear and selects the identified worn replaceable flexible feed cover sections and then, using the process described and illustrated above, removes those worn replaceable flexible feed cover sections from the identified worn area (e.g., the center the roll core 50). The user or operator may then replace the selected identified worn replaceable flexible feed cover sections with an equal number of new, replacement flexible feed cover sections (e.g., 52).

Figure 9H:
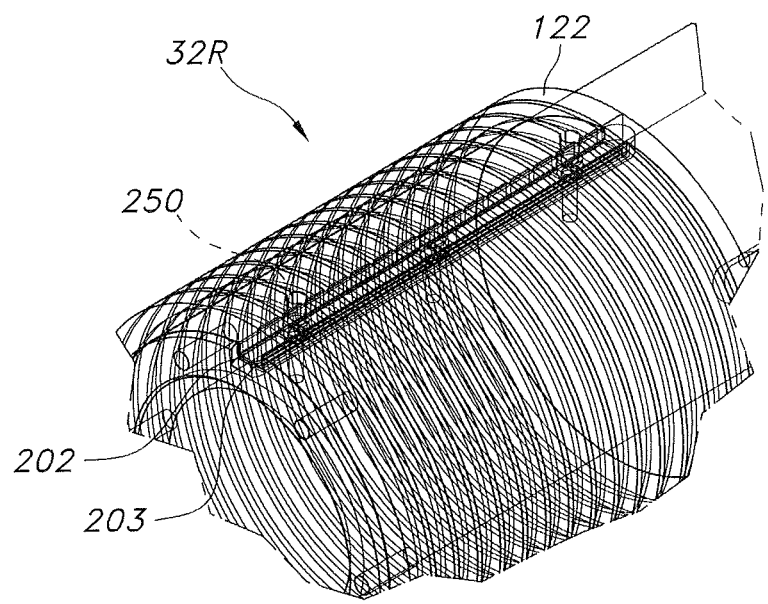

As in the example above, this refurbishment method can include removably mounting the new, replacement flexible feed cover sections on the roll core 50 by locking the locking components (74, 76) on opposite ends (70, 72) of each new replaceable flexible feed cover sections. Those locking components of each replaceable flexible feed cover section are aligned with and then engaged within a locking slot (80, 82, 84, 86) corresponding to the replaceable flexible feed cover section and the keyways draw together the opposite ends (70, 72) of corresponding replaceable flexible feed cover section sections to form very small, operationally negligible end joints (96, 98, 100) to provide a refurbished surface that appears to be a substantially contiguous elastomer, gripping surface. If the configuration of FIGS. 9A-9H is used, the locking components (74, 76) of each replaceable flexible feed cover section comprise at a first end a slotted clamp bar 202 and at a second end a clamp bar 203 configured to cooperate with the slotted clamp bar 202 which receive first and second bolts or threaded fasteners and the mounting step comprises threadably fastening the slotted clamp bar 202 and clamp bar 203 to aligned threaded bores in the roll core's locking slot (as best seen in FIG. 9H) corresponding to the replaceable flexible feed cover section's location on the core to mount and removably secure each feed cover section on the surface of the roll core, where, as the threaded fasteners 250 are tightened into each of the keyways the opposite ends (70, 72) of the corresponding cover section are drawn together to form a very small end joint (96). The keyways are spaced (90) along the length of the roll core to mount the identified, selected replacement feed cover sections in side-by-side abutting relationship on the roll core (or may be spaced apart, leaving gaps on the roll core surface between the covers, not shown).

If the replaceable flexible feed cover sections are placed in abutting relationship and circumferentially offset (92) to space the drawn-together end joints around the circumference of the roll core, the improved elastomer covered feed roll assembly 32R has, effectively, the same feeding performance as a feed roll with a one piece elastomeric roll cover (e.g., prior art elastomer covered feed roll 32).

Having described preferred embodiments of a new and improved apparatus and method, it is believed that other modifications, variations and changes will be suggested to those skilled in the art in view of the teachings set forth herein. It is therefore to be understood that all such variations, modifications and changes are believed to fall within the scope of the present invention as set forth in the appended claims.

What is claimed is:

1. An improved elastomer covered feed roll assembly, comprising:
  a roll core having a cylindrical surface with a plurality of longitudinally extending angularly or circumferentially offset keyways configured as angularly offset longitudinally spaced locking slots;
  at least first and second replaceable flexible feed cover sections wherein each of said replaceable flexible feed cover sections incorporates a flexible backing carrying an elastomeric coating or layer defining an elastomer gripping surface; and
  wherein each of said replaceable flexible feed cover sections incorporates first and second locking components on opposing first and second feed cover section ends, said locking components being configured to be releasably affixed to and engage a corresponding angularly offset longitudinally spaced locking slot to mount and removably secure the replaceable flexible feed cover section on the cylindrical surface of the roll core.

2. The improved elastomer covered feed roll assembly of claim 1, wherein said plurality of longitudinally spaced and circumferentially offset locking slots are configured for mounting and securing a corresponding plurality of side-by-side replaceable flexible feed cover sections in an abutting relationship on said roll core; and
  wherein each of said angularly offset longitudinally spaced locking slots secure said first and second feed cover ends in a manner which defines feed cover end joints which are also offset around the circumference of the feedroll to minimize the effect of the end joints on feeding.

3. The improved elastomer covered feed roll assembly of claim 2, wherein each replaceable flexible feed cover section incorporates multiple feed grooves extending between the ends and along the length of the feed cover section and encircling the feed roll when mounted.

4. The improved elastomer covered feed roll assembly of claim 3, wherein the elastomeric coating or layer for the feed cover is shaped from a durable elastomer having a durometer in the range of 25 to 35.

5. An improved elastomer covered feed roll assembly for use in a feed/pull roll set combination in a sheet finishing machine, comprising:
 a roll core having a cylindrical surface having multiple longitudinally spaced and circumferentially offset elongated keyways each configured as a locking slot;
 multiple replaceable flexible feed cover sections each incorporating a flexible backing or substrate and an elastomeric layer or coating; and
 first and second locking components on opposite ends of each of said replaceable flexible feed cover section flexible backing or substrates, the locking components of each replaceable flexible feed cover section engaging a locking slot corresponding to the replaceable flexible feed cover section to mount and removably secure each replaceable flexible feed cover section on the surface of the roll core, each of said keyways drawing together the opposite ends of its corresponding replaceable flexible cover section to form an end joint, the keyways being spaced along the length of said roll core to mount said replaceable flexible feed cover sections in side-by-side abutting relationship on the roll core and being circumferentially offset to space said end joints around the circumference of the roll core.

6. The improved elastomer covered feed roll assembly of claim 5, wherein each replaceable flexible feed cover section has a width (W) substantially the same as the length of its corresponding keyway and a length (L) sufficient to encircle the circumference of said roll core, wherein said flexible backing or substrate comprises an elongated inner support member of a flexible material, and wherein said replaceable flexible feed cover section incorporates a thin elastomeric coating or layer on the outer surface of the inner support member.

7. A method for refurbishing a feed/pull roll set in a finishing machine incorporating a feed roll having a roll core covered with an elastomer coating, comprising:
 (a) removing the feed roll from the machine;
 (b) stripping the elastomer coating from the roll core;
 (c) cleaning the roll core;
 (d) forming a plurality of longitudinally-extending, circumferentially offset locking keyways on the roll core;
 (e) providing a plurality of replaceable flexible feed cover sections having a flexible backing and a elastomer coating or layer, and including a locking mechanism at respective ends of each cover;
 (f) installing said plurality of replaceable flexible feed cover sections on said roll core, with the locking mechanisms for each cover engaging corresponding keyways to detachably secure said plurality of replaceable feed covers in abutting side-by-side relationship on said roll cover to provide a refurbished feed roll; and
 (g) replacing the refurbished feed roll having said plurality of replaceable feed covers in said machine, whereby future refurbishment of the feed roll is accomplished by replacement of selected detachable replaceable flexible feed cover sections to provide a substantially continuous improved or refurbished elastomer gripping surface defined by the contiguous replaceable flexible feed cover sections.

8. The refurbishing method of claim 7, wherein step (f) comprises: removably mounting said replaceable flexible feed cover sections on the roll core by locking said locking components on opposite ends of each of said replaceable flexible feed cover sections;
 wherein the locking components of each replaceable flexible feed cover section engage a locking slot (80, 82, 84, 86) corresponding to the replaceable flexible feed cover section; and wherein
 the keyways draw together the opposite ends (70, 72) of corresponding replaceable flexible feed cover section sections to form corresponding end joints (96, 98, 100).

9. The refurbishing method of claim 7, further comprising:
 (h) operating the feed/pull roll set for an operation interval having a duration long enough to cause significant wear to the elastomer gripping surface of one or more replaceable flexible feed cover sections in an identified section (e.g., the center) of the improved elastomer covered feed roll assembly;
 (i) identifying the replaceable flexible feed cover sections which have accrued the excessive wear;
 (j) selecting the identified worn replaceable flexible feed cover sections and removing those worn replaceable flexible feed cover sections from the roll core; and
 (k) replacing the selected identified worn replaceable flexible feed cover sections with an equal number of new, replacement flexible feed cover sections.

10. The refurbishing method of claim 9, further comprising:
 removably mounting said new, replacement flexible feed cover sections on the roll core by locking said locking components on opposite ends of each of said new replaceable flexible feed cover sections;
 wherein the locking components of each replaceable flexible feed cover section engage a locking slot corresponding to the replaceable flexible feed cover section; and wherein
 the keyways draw together the opposite ends of corresponding replaceable flexible feed cover section sections to form corresponding end joints.

11. The refurbishing method of claim 10, wherein said locking components of each replaceable flexible feed cover section comprise at a first end a slotted clamp bar and at a second end a clamp bar configured to cooperate with the slotted clamp bar and receive first and second bolts or threaded fasteners and
 said mounting step comprises threadably fastening said slotted clamp bar and said clamp bar in threaded bores in the roll core's locking slot corresponding to the replaceable flexible feed cover section to mount and removably secure each feed cover section on the surface of the roll core, each of the keyways drawing together the opposite ends of its corresponding cover section to form an end joint, the keyways being spaced along the length of the roll core to mount the identified, selected replacement feed cover sections in side-by-side abutting relationship on the roll core and being circumferentially offset to space the end joints around the circumference of the roll core.

12. A replaceable flexible feed cover section configured for releasable attachment to an improved elastomer covered feed roll assembly, comprising:
 (a) a flexible backing or substrate carrying an elastomeric coating or layer defining an elastomer gripping surface;
 (b) first and second locking components affixed on opposite ends of the flexible backing or substrate, wherein at least said first locking component comprises a clamp bar configured to engage a removable fastener and wherein said locking components are configured to be releasably affixed to and engage a corresponding locking slot to mount and removably secure the replaceable flexible feed cover section on a cylindrical surface of a roll core; and (c) wherein said elastomer gripping surface incorporates multiple feed grooves extending between the ends and along the length of the feed cover section and encircling the roll core when said replaceable flexible feed cover section is mounted on and releasably affixed to the roll core to provide an improved elastomer covered feed roll assembly.

13. The replaceable flexible feed cover section of claim 12, wherein the first and second locking components affixed on opposite ends of the flexible backing or substrate are configured to engage a selected one from a plurality of locking slots corresponding to the replaceable flexible feed cover section's selected placement; and wherein keyways are configured to draw together the opposite ends of corresponding replaceable flexible feed cover sections to form corresponding end joints.

14. The replaceable flexible feed cover section of claim 13, wherein said locking components comprise at a first end a slotted clamp bar and at a second end a clamp bar configured to cooperate with the slotted clamp bar and receive first and second bolts or threaded fasteners for threadably fastening said slotted clamp bar and said clamp bar in threaded bores in the roll core's locking slot corresponding to the replaceable flexible feed cover section to mount and removably secure each feed cover section on the surface of the roll core, each of the keyways drawing together the opposite ends of its corresponding cover section to form an end joint, the keyways being spaced along the length of the roll core to mount the identified, selected replacement feed cover sections in side-by-side abutting relationship on the roll core and being circumferentially offset to space the end joints around the circumference of the roll core.

15. The replaceable flexible feed cover section of claim 12, wherein the elastomeric coating or layer for the feed cover is molded-in situ, cast (and then bonded) or shaped rubber having a durometer in the range of 25 to 35.

16. The replaceable flexible feed cover section of claim 15, wherein the elastomeric coating or layer for the feed cover is shaped nitrile rubber having a durometer in the range of 25 to 35.

17. The replaceable flexible feed cover section of claim 15, wherein the elastomeric coating or layer has a durometer of 30.

18. The replaceable flexible feed cover section of claim 12, wherein the flexible backing or substrate comprises an elongated inner support member made of polymer mesh.

19. The replaceable flexible feed cover section of claim 12, wherein the flexible backing or substrate comprises an elongated inner support member made of thin steel.

* * * * *